Aug. 15, 1967    F. E. BLOUNT ETAL    3,336,054
LINER-CARRYING WELL PIPE AND JOINT
Filed Jan. 15, 1965

FLOYD E. BLOUNT
ALVIN V. METLER
INVENTORS

BY *Emil J. Bednar*

ATTORNEY

United States Patent Office 3,336,054
Patented Aug. 15, 1967

3,336,054
LINER-CARRYING WELL PIPE AND JOINT
Floyd E. Blount and Alvin V. Metler, Dallas, Tex., assignors to Mobil Oil Corporation, a corporation of New York
Filed Jan. 15, 1965, Ser. No. 425,770
7 Claims. (Cl. 285—55)

ABSTRACT OF THE DISCLOSURE

This specification describes:

A liner-carrying well pipe and joint. More particularly, a thin-walled liner of a corrosion resistant metal is carried within ferrous well tubing adapted for interconnection by a threaded joint. The tubing is mechanically interconnected by threaded pin and box members with a fluid-tight seal of corrosion resistant material provided between these members. The pin and box members are arranged, by a construction with corrosion resistant metal, to be secured circumferentially to the ends of the liner in the well pipe. When the joint between the liner-carrying well pipe is assembled, there is provided a continuous surface of corrosion resistant material to contain the flow of well fluids within the well pipe, which material includes the thin-walled liner, the pin and box members, and the fluid-tight seal therebetween. The resulting structure of the well pipe and joint can be used with, and is completely compatible with, conventional well equipment.

---

This invention relates to well pipe carrying a corrosion resistant metallic liner and joints for interconnecting such well pipe. More particularly, this invention is directed in one aspect to well pipe carrying a thin-walled liner of titanium and the joints for their threaded interconnection.

Well pipes, usually of ferrous metals, are employed in connection with the drilling of wells into the earth and the production of fluids from such wells. Generally, the well pipes have lengths convenient for handling and carry threaded joints at their ends so that the lengths of well pipe can be readily interconnected. The threaded joints also provide a seal to prevent fluids leaking from between the ends of adjacent well pipes. The seal to fluids is usually provided by interfitting of the threads in the joint and the meeting of interengaging shoulders and opposite surfaces between the joint members. In some instances, a deformable seal ring, carried by one member in the joint is compressed when the well pipes are interconnected to provide a seal to fluids. The well pipes may have abutting shoulders at their joints which limit the interfitting travel of the joint members during make-up. Such abutting shoulders are commonly used on well pipes, especially in joints having a deformable seal, to control development of sealing pressure between the joints being interconnected. Reference may be taken to U.S. Patents 3,047,316 and 3,054,628, wherein such abutting shoulders are clearly shown. The joints with an abutting shoulder are not free of variation of interfitting travel. The abutting shoulders become galled and damaged by wear so that even with a positive travel stop there is a variation in the interfitting of the joint members. However, the joints on well pipes may be designed to make up on a certain number of threads at which time adequate sealing pressure is obtained without any abutting shoulders. The interfitting of suitable threads in such joints is characterized by a certain torque requirement for making up of the joint. Depending on several factors, including thread design, accuracy of make-up torque control, and the compound used to facilitate threading connection, the joints usually are made up within a 2-thread variation. For example, on a ¾″ O.D. well tubing, the make-up torque may vary for this variation from 150 to 250 foot-pounds; and on a 3½″ well tubing, the make-up torque may vary from 1100 to 3000 foot-pounds. Thus, it is easy to see that in any joint construction the interfitting travel of the joint members during make-up varies from one joint to another in a string of well pipe.

One concern in the design of conventional joints for threadedly interconnecting well pipes has been to make them "roughneck proof." However utilitarian a joint may appear in drawings, photographs, and the like, it cannot be used in the oil field unless it is field-usage proof. For example, a string of well pipe is assembled by a working crew which rapidly stabs and threads one well pipe joint into another, usually using power tongs or like means to apply torque to the joint of a magnitude appearing satisfactory to the crew. Many times such work is carried on at night and under other adverse working conditions. For this reason, a considerable make-up variation in the joints is experienced, and any joint which requires precise or even careful assembly is doomed to failure either mechanically or as being too expensive to assemble with the requisite care.

The well pipes within a well many times are subjected to great fluid pressures and damaging environments. This is especially true of well tubing in many recent deep wells which carry production fluids at pressures of even over 14,000 p.s.i. Thus, the joints between well tubings in a string must be able to contain such pressures. A leak of any magnitude at such pressures will soon cut through a joint and cause loss of production fluids into the annulus in the well about the well tubing. Strings of well tubing are also subject in many fields to severe corrosion and embrittlement environments. These environments are usually most severe in the upper portion of the well where temperatures are lower and where liquid waters amounts and tensile stresses are at a maximum.

It has been proposed to coat the interior surfaces of well pipe, particularly well tubing, with various plastics to protect it against environments causing corrosion damage. Problems have arisen with providing a seal to stop fluid leaks at the joint between adjacent plastic-coated well pipes. These joints between plastic-coated tubing have not proved of acceptable utility for various reasons. One reason for this result is that generally a compression-type ring provides the desired seal, which ring requires the joint to be made up very precisely so that such ring is resiliently compressed to a degree sufficient to seal against the pressure within the well pipe but not to such a degree that the plastic coating would be damaged. Additionally, plastic coatings when used in well pipes are very susceptible to damage in the running therein of wire line instruments, and damage during workovers of the well besides early deterioration of the plastics in service.

It has been proposed to make well pipe of corrosion resistant metals to resist damage by mechanical abrasion and the injurious well environments. However, the great cost of such metals relative to ferrous metals prevents making the well pipe entirely of such construction. It has also been proposed to place a thin-walled liner of a corrosion resistant metal within the well pipe, particularly well tubing, to prevent corrosion damage to the ferrous metals of which they are usually made. However, as with the plastic-coated well pipe, problems have arisen in providing a roughneck proof joint which also prevents leaks by a corrosion resistant seal, preferably of a like metal, between the adjacent ends of the metallic liner within the well pipe. For example, a corrosion resistant metal compression-type ring in one structure forms a seal between adjacent liners in the well pipes. The metallic seal ring must be carefully positioned within the joint by hand and then the joint carefully threaded together to certain torque limits to secure the desired sealing pressure between the members of the threaded joint. Any flexing of the joint or variation in make-up torque or improper positioning of the metal seal ring causes the joint to leak fluids.

Up to the present, suitable joints compatible with wellheads, packers and tools, for mechanically coupling well pipes carrying thin-walled liners in fluid-tight interconnection have not been provided to the applicants' knowledge. Thus, the use of liners of corrosion resistant metals appears to be a feasible solution to the problem of protecting well pipe, particularly well tubing, against environments causing corrosion damage if suitable joints can be employed for the threaded interconnection of lined well pipes which also provide the necessary corrosion resistant seal to prevent fluid leaks between the ends of adjacent liners at each joint. The present invention provides these structures.

Additionally, titanium and its alloys by this invention are employed in the thin-walled liner for well pipes for the first time to our knowledge. To be economical at the present, these metals can be used where the liner has a sidewall thickness of about .060 inch, and preferably about .020 inch. These and other similar corrosion resistant metals present fabrication difficulties when they are to be secured to the metals conventionally employed for well pipes. For example, titanium and its alloys cannot be conventionally welded to ferrous well pipes. They can be joined by certain brazing methods but these methods greatly increase the fabrication costs. However, titanium and its alloys can be welded one to another economically by conventional methods without any great difficulties.

It is an object of this invention to provide a well pipe carrying a liner of corrosion resistant material and a compatible joint to other well equipment which necessarily provides a mechanical and fluid seal between well pipes and their liners without the described problems characteristic of prior well pipes carrying corrosion resistant metallic liners. It is another object to provide lined well pipes, and connecting threaded joints of conventional design which have been found "roughneck proof," for ready employment in accordance with this invention. Another object is to use in ferrous well pipes thin-walled liners of titanium and titanium alloys in accordance with the preceding objects. Another object is to provide well pipes carrying a titanium liner with joints employing a deformable ring as a seal against fluid pressure which joint does not require a precise interthreading connection or make-up torque requirement. Another object is to provide a well pipe constructed of conventional high strength metals and carrying a thin-walled titanium liner with a joint constructed of titanium or its alloys. These and further objects will be apparent when read in conjunction with the following detailed description, the appended claims, and the attached drawings, wherein:

Figure 1:
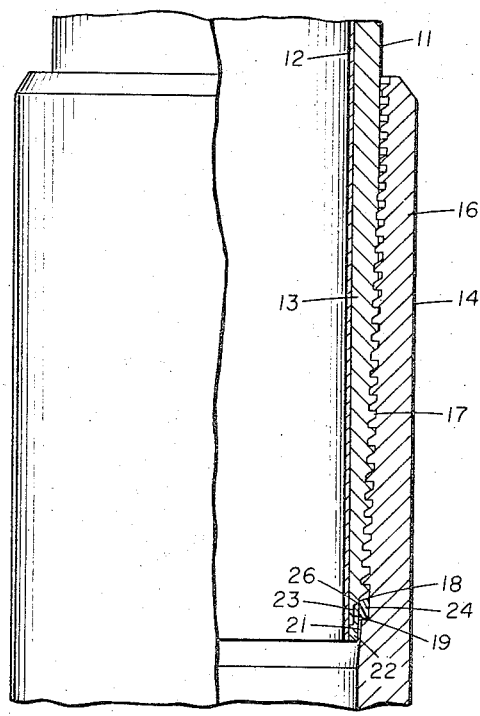
FIGURE 1 is a longitudinal cross section of a threaded joint of this invention with a deformable seal ring for interconnecting well pipe which carries a thin-walled liner of a corrosion resistant metal.

Referring now to FIGURE 1, a well pipe, such as tubing 11 of conventional ferrous metals, carries in sidewall engaging relationship a thin-walled liner 12 of a corrosion resistant material extending its length. The corrosion resistant material, preferably metal, should be relatively ductile and have sufficient hardness so as not to be readily injured by wire line operations and the like. Examples of suitable metals are K-Monel, 410 stainless steel, titanium and its alloys such as Ti–6A1–4V. Preferably, this liner 12 has a thickness between about .020 and .060 inch and is made of titanium or a titanium alloy. By the term "sidewall engaging relationship" as used herein, it is meant that the liner 12 within the tubing 11 is in sufficient engagement therewith so that the radial expansion of the liner 12 responsive to applied fluid pressure during use causes no longitudinal contraction of a magnitude sufficient to sever the liner 12 or to separate its ends from their connection to the tubing 11. More particularly for such arrangement, the liner 12 is positioned in the tubing 11. Thereafter, the liner 12 is expanded by any suitable means into sidewall engagement with the inner surface of the tubing 11. For example, a forcing mandrel may be passed through the liner 12 expanding it radially outwardly into suitable sidewall engagement with the tubing 11. The liner 12, when of titanium and its alloys, cannot be shrink-fitted within the tubing 11. The reason for this result is that titanium will expand and contract more in response to pressure changes than ferrous metals. Thus, the liner 12 cannot be expanded into such intimate engagement with the tubing 11 that the two can be considered mechanically as one.

The tubing 11 carries a pin member 13 on at least one of its ends. Preferably, a pin member 13 is carried at each end of the tubing 11. A coupling 14, carrying a box member 16 at each of its ends, is employed for interconnecting with the pin member 13 of the tubing 11. However, the box member 16 may be integrally carried directly on another length of well pipe, if desired. The pin and box members 13 and 16, respectively, are tubular with the pin member 13 received axially forwardly into the box member 16. The pin and box members may be of conventional design with any suitable interfitting style of threads. In the embodiment of FIGURE 1, these members are shown with tapered threads 17 of the modified truncated buttress style. The pin and box members 13 and 16, respectively, carry means through which sealing pressure between them can be asserted. Such means may be provided by the threads 17 and by various engaging shoulders and surfaces employed in the threaded joints associated with well pipes.

The pin member 13 has a projected reduced diameter portion at the beginning of its threads and the box member 16 at the inner end of its threads has an increased diameter portion residing opposite the reduced diameter portion of the pin member 13 when these members are interfitted. The pin member 13 integrally carries in coaxial alignment at the reduced diameter portion a tubular extension or sleeve 22 of a corrison resistant material. Preferably, the sleeve 22 is of titanium or titanium alloys. The sleeve 22 is secured on the pin member 13 by any suitable means. More particularly as one means for this purpose, the pin member 13 has a first projecting reduced diameter portion 18 at the very beginning of its threads and a second projecting reduced diameter portion 19 extending forwardly from the first projecting reduced diameter portion 18. The box member 16 at the inner end of its threads and extending rearwardly therefrom has an increased diameter portion 21 which resides opposite the first and second projecting reduced diameter portions 18 and 19 of the pin member 13. The sleeve 22 has at one end a reduced diameter step 23 for mounting encirclingly about the portion 19 on the pin member 13. The exterior sidewall surface of the sleeve 22 extends away from the threads on the pin member 13. The interior sidewall surfaces of the sleeve 22 and the pin member 13 are aligned. The step 23 may be made undersized and the sleeve 22 press-fitted onto the portion 19 of the pin member 13. Since titanium cannot be welded directly to steel, brazing can be used if an intimate union is desired between the sleeve 22 and the pin member 13. However, the sleeve 22 need not be in intimate union with the pin member 13 for the purposes of this invention. The sleeve 22 is circumferentially secured by suitable means to the end of the liner 12 carried in the tubing 11. The sleeve 22 and the liner 12 may be secured by brazing, or when of titanium or titanium alloys, by welding, if desired.

Sealing means are carried by at least one of the pin and box members 13 and 16, respectively. The sealing means provide a seal to fluids between the opposite surfaces of the pin and box members. Preferably, the seal is between the exterior sidewall surface of the sleeve 22 and the increased diameter portion 21 of the box member 16, i.e., at their reduced and increased diameter portions 18 and 21, respectively, when the pin and box members are interfitted. The sealing means in this embodiment are provided by an annular seal 24 constructed of a corrosion resistant material which can be deformed during assembling of the joint to provide a fluid seal between the pin and box members 13 and 16, respectively. Preferably, the seal 24 is constructed of tetrafluorethylene polymer.

In the structure shown in FIGURE 1, a groove 26 to receive the seal 24 is provided in the portion 21 of the box member 16 adjacent the inner ends of its threads. The groove 26 has a depth at least the height of threads 17 and a width at least the distance between the next adjacent threads. The seal 24 at its downstream end and also on each side is solidly supported. The upstream side of the seal 24 is exposed to the fluid pressure within the tubing 11. Thus, the seal 24, if initially operative as a compression seal, will at increased pressures also function as a fluid-pressure actuated seal. This is of great advantage in that the seal 24 does not require a certain compression by the said members being threaded to any certain interfitting or torque-limiting requirements for effective sealing action at high pressures.

The tubing 11 can be disposed only at the uppermost portion of a well where corrosion damage is severe and joined to suspended well pipes by the coupling 14 which in this usage may be of any suitable metal in accordance with conventional practices. Preferably, the tubing 11 is placed in a well as a continuous string with each tubing 11 carrying a liner 12 and the coupling 14 constructed of a corrosion resistant metal. Preferably, the same metal is used in the liner 12, the sleeve 22, and the coupling 14.

Where the liner 12, sleeve 22, and coupling 14 are of titanium or titanium alloys, and the sealing rings 24 is of polytetrafluorethylene, then a continuous surface of corrosion resistant material is presented to fluid flow within the string of tubing 11. The structure which has been described relative to FIGURE 1 is readily fabricated with a minimum of machining from the pipe joint described in U.S. Patent 3,047,316. However, any "roughneck proof" pipe joints may be used in a like manner if desired. This embodiment of the present invention is well suited to satisfy the stated objects and to overcome the difficulties in employing lined well pipes.

Figure 2:
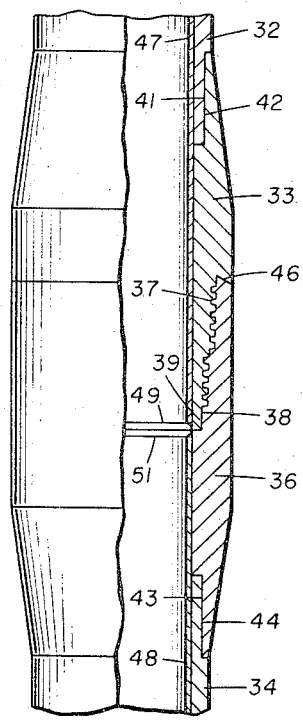
FIGURE 2 is a longitudinal cross section illustrating another threaded joint of the present invention for interconnecting well pipes carrying thin-walled liners.

Referring now to FIGURE 2, there is shown an embodiment of the present invention well suited for interconnecting lined well pipes by upset threaded joints. Well pipes, such as tubings 32 and 34, carry at their ends a pin member 33 and a box member 36. The pin and box members 33 and 36, respectively, are tubular and either internally or externally upset, with the pin member 33 received axially forwardly into the box member 36. The pin and box members have interfitting threads 37 and means through which sealing pressure is exerted between them. The threads 37 may be of any particular configuration but are shown as offset square threads. The pin member 33 has a projecting reduced diameter portion 38 at the beginning of its threads and the box member 36 at the inner end of its threads has an increased diameter portion 39 residing opposite the reduced diameter portion 38 of the pin member 33 when the pin and box members 33 and 36 are interfitted. The pin and box members 33 and 36, respectively, are constructed of a corrosion resistant metal, preferably titanium or titanium alloys. The pin member 33 and the tubing 32 are secured by any suitable means. In one aspect, the tubing 32 and the pin member 33 are provided with complementary enlarged diameter surfaces 41 and 42, respectively, for mounting the pin member 33 on the tubing 32 with the step surfaces in engagement and then secured to one another. For example, the pin member 33 may be brazed into rigid connection with the tubing 32. The box member 36 and the tubing 34 are secured to one another by any suitable means. For example, they are provided with complementary enlarged diameter surfaces 43 and 44 for mounting the box member 36 on the tubing 34 and are secured by any suitable means. For example, the box member 36 may be rigidly secured to the tubing 34 by brazing.

Preferably, the construction of the box and pin members is of conventional design. In FIGURE 2, these members are the Hydril "CS" external upset joint. In this joint, there are abutting shoulders 46 carried by the pin and box members 33 and 36, respectively, limiting their axial travel or interfitting and providing a seal. Also, the means through which sealing pressure is exerted include mechanical engagement between opposite sidewall surfaces at the portions 38 and 39 and the threads 37. Thus, it will be apparent a fluid-tight seal is provided along with the mechanical interconnection between these members when the pin and box members 33 and 36 are interfitted.

The tubings 32 and 34 carry in sidewall engagement thin-walled liners 47 and 48, respectively, of a corrosion resistant metal extending their lengths to the pin and box members 33 and 36, respectively. Preferably, the ends of the liners 47 and 48 are spaced a short distance from the interior meeting ends of the pin and box members 33 and 36. This arrangement conveniently provides space in which the liners are secured to these members. The pin member 33 adjacent its farmost terminus is circumferentially and integrally secured to the end of the liner 47. Any means may be employed for securing the liner 47 to the pin member 33. Preferably, the liner 47 is circumferentially welded to the pin member 33. Such welding is denoted in FIGURE 2 by the number 49. The box member 36, adjacent the farmost extremity of the pin member 33 when the members 33 and 36 are interfitted, is circumferentially and integrally secured to the end of the liner 48. Any means for securing the liner 48 to the pin member 36 may be employed. Preferably, the end of the liner 48 is circumferentially welded to the box member 36. Such welding is denoted by the numeral 51. The terminology of describing the carrying of the liners 47 and 48 within the tubings 32 and 34 as in sidewall engagement, and the metals of their construction, are within the terminology heretofore defined for the embodiment displayed in FIGURE 1.

The pin and box members 33 and 36, by the previously described means, obtain a fluid-tight seal between their opposite sidewall surfaces when the pin and box members 33 and 36 are interfitted. Thus, the described joint not only mechanically interconnects the lined tubings 32 and 34 to one another, but also provides a corrosion resistant sealing means at the joint between the liners 47 and 48.

In the embodiment shown in FIGURE 2, the upset pin and box members 33 and 36 interconnected to the tubings 32 and 34 are of conventional design with the fabrication of such members and tubings obtained by conventional practices. A continuous surface presented to fluid flow of a corrosion resistant metal, preferably titanium or its alloys, is produced in the lined well pipe and joint of this embodiment. As the pin and box members 33 and 36 are relatively short, rather expensive metals may be employed for their fabrication with subsequent connection to conventional tubings 32 and 34. The advantages of such an arrangement are obvious, especially where for practical purposes the well pipe and joint mechanically and visually are identical to the conventional joints employed in everyday oil field installations. Since the threaded connections between the pin and box members are conventional, they can be of a conventional design which has been found "roughneck proof."

Figure 3:
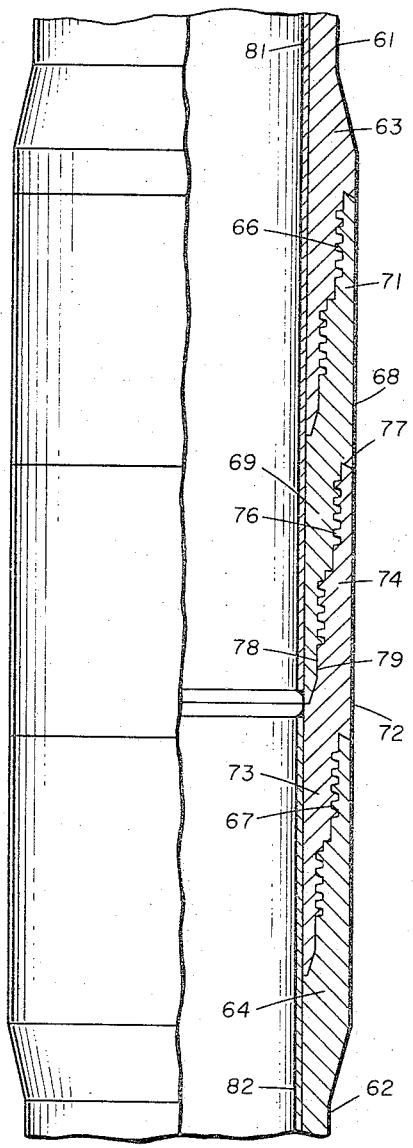
FIGURE 3 is a view partially in elevation and partially in longitudinal cross section of yet another embodiment of this inventiton of a joint employed with liner-carrying well pipes.

Referring now to FIGURE 3, another embodiment of the present invention is shown which combines lined well pipe having conventional threaded joints with threaded interconnections of corrosion resistant metals into one assembly. Well pipes, like tubings 61 and 62, at their extremities carryy pin and box members 63 and 64, respectively, which may be of conventional design. The pin and box members 63 and 64 are shown as external upset joints carrying threads 66 and 67. These threads 66 and 67 may be of any form suitable for interconnecting well pipes. In the embodiment shown in FIGURE 3 the threads and upset pin and box members 63 and 64 are the Hydril "CS" type, although other joints can obviously be used. Usually, the pin and box members 63 and 64 will have the same thread design for their threaded interfitting into sealing engagement.

The tubing 61 carries a first tubular member or tool joint 68 which has threaded pin and box connections 69 and 71, respectively, at its ends. The box connection 71 is received axially forwardly with interfitting of threads 66 over the pin member 63 carried on the tubing 61. The tubing 62 carries a second tubular member or tool joint 72 which has threaded pin and box connections 73 and 74, respectively, at its ends. The pin connection 73 is received axially forwardly with interfitting of threads 67 into the box member 64 carried by tubing 62. The pin connection 69 is received axially forwardly into the box connecttion 74 with interfitting of threads 76 to provide a suitable mechanical interconnection with fluid sealing therebetween. The tool joints 68 and 72 are constructed of a corrosion resistant metal, preferably titanium or its alloys. The tool joints 68 and 72, of course, carry means through which sealing pressure is exerted between them. As described for the previous embodiments, these means through which sealing pressure is exerted usually include the interfitting threads 76 and also abutting shoulders 77 and the sidewall surfaces of reduced and increased diameter portions 78 and 79 which engage on interconnection of the tool joints 68 and 72.

The tubings 61 and 62 carry thin-walled liners 81 and 82, respectively, extending substantially their lengths to the pin and box connections 69 and 74, respectively. The liners 81 and 82 are constructed of corrosion resistant metals, preferably titanium or its alloys. The liner 81 is circumferentially and integrally secured to the tool joint 68 adjacent its farmost inner extremity by any suitable means. For example, the securing of the liner 81 to the tool joint 68 may be by welding. Similarly, the liner 82 is secured circumferentially and integrally to the tool joint 72 a slight distance from its connection with the tool joint 68. The liner 82 may be secured to the tubular member 72 by any suitable means. For example, such means may be by welding.

It will be apparent as in the previous embodiment that a corrosion resistant seal is obtained between means on the tool joints 68 and 72 when they are threadedly interfitted, especially at the reduced and increased diameter portions 78 and 79.

Preferably, the threads 66, 67, and 76 between the various threaded members of this embodiment have the same thread designs whereby these members may be threadedly interfitted one into the other. As previously mentioned, the tool joints 68 and 72 can be of any conventional design. These tool joints can be of the pin-to-pin, box-to-box, or pin-to-box variety depending upon the pin and box members carried on the tubings 61 and 62. The tool joints are also denoted as "substitutes" or "subs" and sometimes are termed "bushings." Most commonly they are used with well tubing. The tool joints may be used as substitutes to provide connections between well tubing of different sizes or different thread designs.

Also, they are used to protect the threaded connection carried on the tubing where severe and repeated threaded interconnections are encountered. Thus, by employing a conventional tool joint to be carried on the tubings 61 and 62 but constructed of a corrosion resistant metal, there is provided a ready means by which thin-walled liners may be readily secured to ferrous well tubing with the surfaces presented to fluid flow in such well tubing being only of a corrosion resistant metal. The tubings and joint otherwise have the mechanical and visual identity with structures found in conventional oil well uses.

From the foregoing it will be readily seen that there has been provided structures which satisfy all of the objects of the present invention and in which there is provided a joint for mechanically interconnecting well pipe, such as well tubing, carrying a thin-walled liner of a corrosion resistant metal with a corrosion resistant fluid-tight seal between the liners, tubings, and any other joint members. More particularly, there is also provided structures substantially identical to those conventionally used in the oil fields and in which the joint members may be of a conventional design that has proven "roughneck proof."

It will be understood that certain features and subcombinations are of utlity and may be employed without reference to other features and subcombinations. This is contemplated by and is within the scope of the claims.

As many possible embodiments may be made of the invention without departing from the scope thereof, it is to be understood that all matters herein set forth are to be interpreted as illustrative and not in a limiting sense.

What is claimed is:

1. A joint interconnecting well pipe which carries a thin-walled liner of a corrosion resistant metal comprising:
   (a) tubular pin and box members, the pin member received axially forwardly into the box members, the members having interfitting threads and means through which sealing pressure is exerted between them,
   (b) the pin member having a projecting reduced diameter portion at the beginning of its threads and the box member at the inner end of its threads having an increased diameter portion residing opposite the reduced diameter portion of the pin member when the pin and box members are interfitted,
   (c) said pin and box members of a corrosion resistant metal with the pin member carried at one end of a first well pipe, the box member carried at one end of a second well pipe, and said well pipes each carrying in sidewall engaging relationship a thin-walled liner of a corrosion resistant metal extending their lengths to the respective pin and box members,
   (d) the pin member adjacent its forward terminus circumferentially and integrally secured to the end of the liner carried in the first well pipe,
   (e) the box member adjacent the forward extremity of the pin member when said members are interfitted circumferentially and integrally secured to the end of the liner carried in the second well pipe, and
   (f) sealing means carried by at least one of the pin and box members at the reduced and increased diameter portions for providing a seal between their opposite sidewall surfaces when the pin and box members are interfitted.

2. A joint interconnecting well pipe which carries a thin-walled liner of a corrosion resistant metal comprising:
   (a) tubular pin and box members, the pin member received axially forwardly into the box member, the members having interfitting threads and means through which sealing pressure is exerted between them, (b) the pin member having a projecting reduced diameter portion at the beginning of its threads and the box member at the inner end of its threads having an increased diameter portion residing opposite the reduced diameter portion of the pin member when the pin and box members are interfitted, (c) said pin and box members of a corrosion resistant metal with the pin member and a first well pipe provided with complementary enlarged diameter surfaces whereby the pin member is coaxially mounted on said well pipe with the respective step surfaces in engagement, and means rigidly securing said pin member to the first well pipe; the box member and a second well pipe provided with complementary enlarged diameter surfaces whereby the box member is coaxially mounted on said well pipe with the respective surfaces in engagement, and means rigidly securing said pin member to the second well pipe; and said first and second well pipes each carrying in sidewall engaging relationship a thin-walled liner of a corrosion resistant metal extending their lengths to the respective pin and box members, (d) the pin member adjacent its forward terminus circumferentially and integrally secured to the end of the liner carried in the first well pipe, (e) the box member adjacent the forward extremity of the pin member when said members are interfitted circumferentially and integrally secured to the end of the liner carried in the second well pipe, and (f) sealing means carried by at least one of the pin and box members at the reduced and increased diameter portions for providing a seal between their opposite sidewall surfaces when the pin and box members are interfitted.

3. A joint interconnecting well pipe which carries a thin-walled liner of a corrosion resistant metal comprising:

(a) first and second well pipes carrying at their ends threaded members, (b) first and second tubular members of a corrosion resistant metal each having at their ends threaded connections, (c) said first tubular member having threads at one end interfitting with the threaded member carried on said first well pipe whereby the first tubular member and the threaded member on said first well pipe are received axially into interconnection with interfitting of their threads, (d) said second tubular member having threads at one end interfitting with the threaded member carried on said second well pipe whereby the second tubular member and the threaded member on said second well pipe are received axially into interconnection with interfitting of their threads, (e) said first and second tubular members having interfitting threads at their ends other than their ends interconnecting to the first and second well pipes whereby said tubular members are received axially into interconnection with interfitting of their threads, and said members having means through which sealing pressure is exerted between them, (f) one of said first and second tubular members at their ends interconnected to one another having a projecting reduced diameter portion at the beginning of its threads and the other of said first and second tubular members having the inner end of its threads an increased diameter portion residing opposite the mentioned reduced diameter portion when said tubular members are interfitted, (g) said well pipes each carrying in sidewall engaging relationship a thin-wall liner of a corrosion resistant metal extending their lengths to the respective first and second tubular members, said liners circumferentially and integrally secured at their ends to the respective first and second tubular members, and (h) sealing means carried by at least one of the first and second tubular members at the reduced and increased diameter portions for providing a seal between the opposite sidewall surfaces of the mentioned portions when said first and second tubular members are interfitted.

4. A joint interconnecting well pipe which carries a thin-walled liner of a corrosion resistant metal comprising:

(a) a first well pipe carrying at one of its ends a threaded pin member and a second well pipe carrying at one of its ends a threaded box member, (b) a first tubular member of a corrosion resistant metal at its ends having pin and box connections, said member having threads at its box connection interfitting with the threads of the pin member on said first well pipe and said box connection being received axially forwardly with interfitting threads into the pin member carried on the first well pipe, (c) a second tubular member of a corrosion resistant metal at its ends having pin and box connections, said member having threads at its pin connection interfitting with the threads of the box member on said second well pipe and said pin connection being received axially forwardly with interfitting threads into the box member carried on the second well pipe, (d) the pin connection of the first tubular member received axially forwardly into the box connection of the second tubular member, the pin and box connections of said tubular members having interfitting threads and means through which sealing pressure is exerted between them, (e) the pin connection of the first tubular member having a projecting reduced diameter portion at the beginning of its threads and the box connection of the second tubular member having at the inner end of its threads an increased diameter portion residing opposite the reduced diameter portion of the pin connection when the pin and box connections are interfitted, (f) said well pipes each carrying in sidewall engaging relationship a thin-walled liner of a corrosion resistant metal extending their lengths to the respective pin and box connections of the first and second tubular members, said liners circumferentially and integrally secured at their ends to the respective pin and box connections of the first and second tubular members, and (g) sealing means carried by at least one of the pin and box connections at the reduced and increased diameter portions on the first and second tubular members for providing a seal between the opposite sidewall surfaces of the mentioned reduced and increased diameter portions of said pin and box connections when the first and second tubular members are interfitted.

5. The joint of claim 4 wherein the threaded pin and box members on the first and second well pipes have interfitting threads whereby said members can be received axially into interconnection with one another.

6. The joint of claim 4 wherein the threaded pin and box members on the first and second well pipes and the pin and box connections on the first and second tubular members have interfitting threads whereby said members and connections can be received axially into interconnection with one another.

7. A joint interconnecting well pipe which carries a thin-walled liner of a corrosion resistant metal comprising:

(a) well pipe having an axial flow passage for carrying fluids at an elevated pressure and each said well pipe integrally carrying at its ends threaded tubular pin members, a tubular box member of a corrosion resistant metal and being adapted for receiving said pin members interfitted coaxially by threads carried at each of its ends, one of said pin members received axially forwardly into said box member at each of its ends for coaxially joining adjacent well pipe, said pin and box members having interfitting threads for mechanically interconnecting adjacent well pipe carrying said members and means through which sealing pressure is exerted between said pin and box members, (b) a first reduced diameter portion projecting from each pin member at the beginning of its threads, said box member provided an increased diameter portion at each of the inner ends of its threads and extending rearwardly therefrom, and said reduced and increased diameter portions of said pin and box members residing opposite one another at least in part when said members are interfitted, (c) said box member adjacent the inner ends of its threads and in each said increased diameter portion having a groove of a depth at least the height of said threads and a width at least equal to the distance between adjacent threads next to said groove, each said groove residing opposite said reduced diameter portion projecting from said pin member when said pin and box members are interfitted, (d) a thin-walled liner of corrosion resistant metal disposed within each well pipe and extending to adjacent the ends of said pin members carried thereon, said liner outwardly distended into a sidewall engaging relationship against the inner surfaces of said well pipe so that upon fluids, at elevated pressure, entering said flow passage said liner undergoes insufficient radial expansion that longitudinal contraction causes rupturing of said liner, (e) a tubular sleeve of a corrosion resistant metal having at one end an enlarged diameter surface for mounting said sleeve encirclingly on the reduced diameter portion projecting from said pin member at the beginning of its threads, each of said pin members carrying a tubular sleeve mounted on the reduced diameter portions thereof, and said thin-walled liner in said well pipe secured circumferentially at each end to said sleeves, (f) said reduced and increased diameter portions of said pin and box members spaced apart a distance sufficient that said sleeves carried on said pin members do not engage said box member with an injurious force when said members are interfitted, and (g) a deformable sealing ring of polymeric plastic material substantially filling each said groove, and said ring having a thickness sufficient to engage the exterior surfaces of said sleeves mounted about said reduced diameter portions of said pin members and to engage the interior sidewall and bottom surfaces of each said groove in said box member, and said ring being compressed axially in each said groove by said threads of said pin members when said pin and box members are interfitted and by such engagement producing a seal against fluid leakage between said sealing ring and the engaged surfaces of said grooves and said sleeves carried on the ends of said pin members; and when said pin and box members are interfitted, said ring providing a mechanical lock to anchor each said sleeve about the terminus of each said pin member so that elastic elongation of said well pipe will not pull said sleeves and liner from their operative position in said pin and box members.

References Cited

UNITED STATES PATENTS

| | | |
|---|---|---|
| 2,086,151 | 7/1937 | Bannerman. |
| 2,132,574 | 10/1938 | Moise _____ 285—55 |
| 2,267,339 | 12/1941 | Paulsen. |
| 2,919,936 | 1/1960 | Hurley _____ 285—55 |
| 3,020,068 | 2/1962 | Costanzo _____ 285—55 |
| 3,100,656 | 8/1963 | MacArthur _____ 285—55 |
| 3,210,098 | 10/1965 | Watts _____ 285—173 |
| 3,266,821 | 8/1966 | Safford _____ 285—55 X |

FOREIGN PATENTS

| | | |
|---|---|---|
| 649,610 | 10/1962 | Canada. |
| 259,891 | 10/1926 | Great Britain. |

CARL W. TOMLIN, *Primary Examiner.*

R. G. BERKLEY, *Assistant Examiner.*